United States Patent [19]

Cuscovitch

[11] 4,267,618

[45] May 19, 1981

[54] MOBILE CLEANING APPARATUS HAVING ADJUSTABLE WINDOW CLOSURE PANEL ASSEMBLY

[76] Inventor: John F. Cuscovitch, 42 Woodbridge Ave., East Hartford, Conn. 06108

[21] Appl. No.: 86,536

[22] Filed: Oct. 19, 1979

[51] Int. Cl.³ .............................................. A47L 9/00
[52] U.S. Cl. .................................. 15/339; 15/257 R; 15/321
[58] Field of Search ................. 15/257, 314, 321, 339, 15/340, 300 R; 160/180, 372, 374; 49/48, 55; 52/208, 220, 221

[56] References Cited

U.S. PATENT DOCUMENTS

| | | | |
|---|---|---|---|
| 2,270,579 | 1/1942 | Chamberlin et al. | 15/346 R |
| 2,708,927 | 5/1955 | Dixon et al. | 160/180 X |
| 3,567,112 | 3/1971 | Wittekind | 49/55 X |

*Primary Examiner*—Edward L. Roberts
*Attorney, Agent, or Firm*—McCormick, Paulding & Huber

[57] ABSTRACT

A carpet cleaning apparatus carried by a motor vehicle has a plurality of flexible cleaning hoses which are brought into a building through apertures in an adjustable panel assembly which forms a closure for a window opening. The hoses may pass through gasketed openings in the panel assembly or may be connected to hose couplings which are attached to the panel assembly.

10 Claims, 7 Drawing Figures

MOBILE CLEANING APPARATUS HAVING ADJUSTABLE WINDOW CLOSURE PANEL ASSEMBLY

BACKGROUND OF THE INVENTION

This invention relates in general to cleaning apparatus and deals more particularly with an improved mobile carpet cleaning unit. A unit of the aforedescribed type generally includes a cleaning machine mounted in a motor vehicle and has long flexible vacuum and cleaning solution hoses which are connected to the cleaning machine and extend from the vehicle and which are brought into a building through an open door or window. If the apparatus is electrically operated a long electrical supply cord is usually included which is also brought into the building to connect the apparatus to an electrical outlet within the building. Heretofore, it has been the general practice to bring the cleaning hoses and electrical supply cord into the building through an open door or window however, this arrangement is not entirely satisfactory, because it results in heat loss from the building in cold weather and reduction in the efficiency of building air conditioning equipment in warm weather. Insects may also enter the building through the open door or window which must remain open for a prolong period while the cleaning operation is performed. The present invention is concerned with the aforesaid problems.

SUMMARY OF THE INVENTION

In accordance with the present invention a panel assembly is provided for use with a mobile cleaning apparatus which includes a vehicle and a cleaning machine carried by the vehicle and having at least one flexible cleaning hose attached to it. The panel assembly has at least one variable dimension for positioning in an opening defined by a window frame and a movable window supported in the frame. The panel assembly has an aperture therein which receives an associated portion of the hose therethrough and which closely complements the associated portion.

DETAILED DESCRIPTION OF PREFERRED EMBODIMENT

Figure 1:
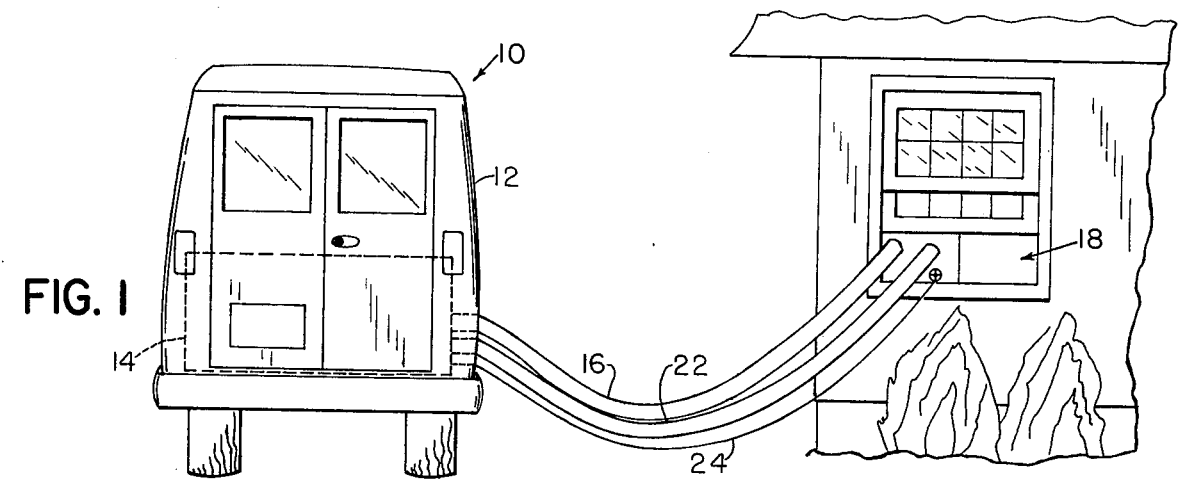
FIG. 1 is a fragmentary elevational view and shows a typical cleaning apparatus embodying the invention in use.
Figure 2:
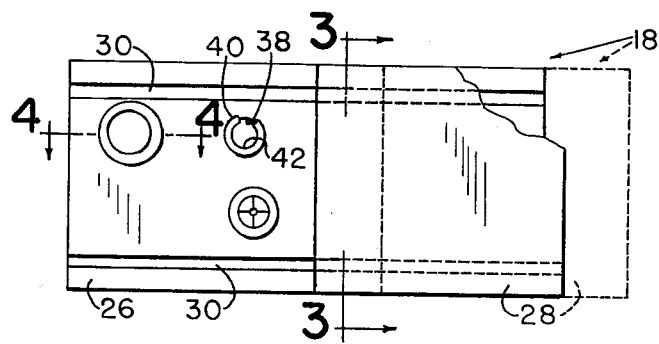
FIG. 2 is a somewhat enlarged elevational view of the panel assembly of FIG. 1.
Figure 3:
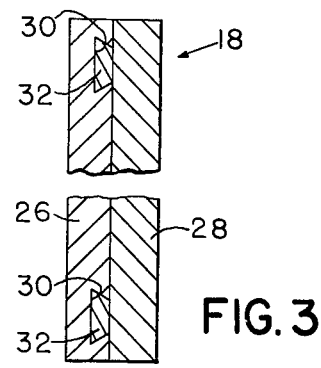
FIG. 3 is a somewhat further enlarged sectional view taken along the line 3—3 of FIG. 2.
Figure 7:
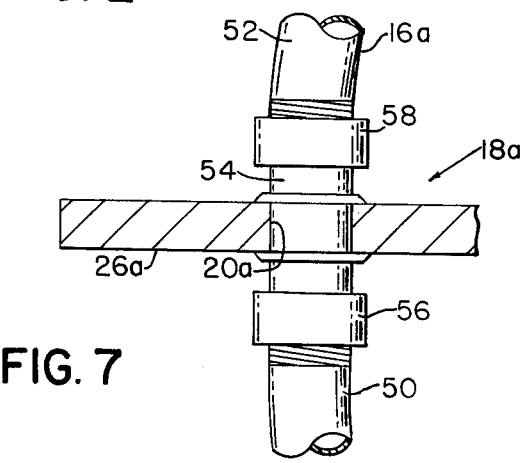
FIG. 7 is similar to FIG. 4 but illustrates another embodiment of the invention.

Turning now to the drawing and referring first particularly to FIG. 1, a mobile cleaning apparatus embodying the present invention is indicated generally by reference numeral 10. The apparatus 10 includes a vehicle or truck 12 which carries a cleaning machine 14. In accordance with the invention, the cleaning machine 14 includes at least one elongated flexible hose 16, which extends from the vehicle, and an adjustable panel assembly, indicated generally at 18, for positioning in an opening defined by a window frame and a movable window supported by the frame. The panel assembly 18 has an aperture 20 therein which receives an associated portion of the flexible hose 16 therethrough and which closely complements the associated portion of the hose. The illustrated apparatus 10 is particularly adapted for cleaning carpets and the like and includes a vacuum hose such as the hose 16 and another flexible cleaning hose 22 of somewhat smaller diameter used to carry a cleaning solution into the building. The machine 14 is electrically operated and further includes flexible electrical power cord 24, which usually must also be brought into the building for connection to an electrical outlet within the building. The illustrated panel assembly 18 is provided with further apertures therein for receiving the hose 22 and the power cord 24 therethrough, as will be hereinafter further discussed.

Considering now the panel assembly 18 in further detail and referring particularly to FIGS. 2–6, it includes a pair of generally rectangular panel sections 26 and 28 connected together in sliding relation to provide at least one variable dimension. Various arrangements may be provided for connecting the panel sections, however, the panel section 26 has a pair of parallel dovetail slots 30, 30 which receive dovetail projections 32, 32 on the panel section 28. The latter projections are formed by elongated parallel dovetail strips attached to the panel section 28. Thus, the two panel sections 26 and 28 are connected together for sliding movement relative to each other so that the longitudinal dimension of the panel assembly 18 is variable. The panels are movable relative to each other through a range of positions, two such positions being shown in full and broken lines in FIG. 2. Preferably, and as shown, the panel sections are solid and may be made from wood or other suitable material. The illustrated panel assembly 18 has a cylindrical hole 34 through it which has a diameter substantially larger than the outside diameter of the hose 16. A flexible gasket 36 is mounted on the panel section 26 within the hole 34 and defines the aperture 20, which has a diameter substantially equal to the outside diameter of the hose 16.

The illustrated panel assembly 18 is formed with another cylindrical hole 38 which has a diameter somewhat larger than the outside diameter of the hose 22. Another flexible gasket 40 similar to the gasket 36, but of somewhat smaller size, is mounted on the panel assembly within the hole 38 and defines another aperture 42 substantially equal to the outside diameter of the hose 22 for receiving the latter hose therethrough. The hoses 16 and 22 are usually provided with suitable adaptors to facilitate connection of carpet cleaning tool thereto. The apertures 20 and 42 are preferably adapted to receive the adaptor ends of the hoses therethrough and for this reason the gaskets are preferably made from relatively soft flexible rubber, plastic, or other suitable material which will yield, as necessary, to allow the adaptor ends of the hoses to be forceably inserted therethrough, if necessary, and which will substantially complement and sealingly engage associated portions of the hoses 16 and 22 after the hoses have been passed therethrough.

A third hole 44 is formed in the illustrated panel section 26 to receive another gasket 46 to accommodate the electrical power supply cord 24. Since the supply cord 24 is provided with an electrical plug connector the gasket 46 must be arranged to allow the plug to pass therethrough. The illustrated gasket 46 is also formed from soft rubber or plastic material and includes a relatively thin central diaphram section which has a small circular aperture at its center the diameter of which is substantially equal to the diameter of the power supply cord 24. The diaphram section further includes a central aperture 48 and a plurality of slits which extend diametrically thereacross. The slitted diaphram section of the gasket permits the plug to be inserted through the gasket and cooperates with an associated portion of the power supply cord 24 to provide a substantial closure for the hole 44 after the cord has been passed through the panel assembly 18.

Figure 6:
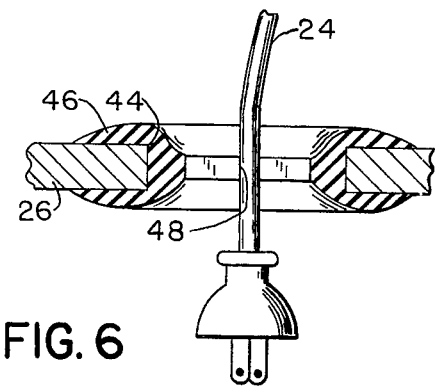
FIG. 6 is a sectional view taken along the line 6—6 of FIG. 5.
Figure 4:
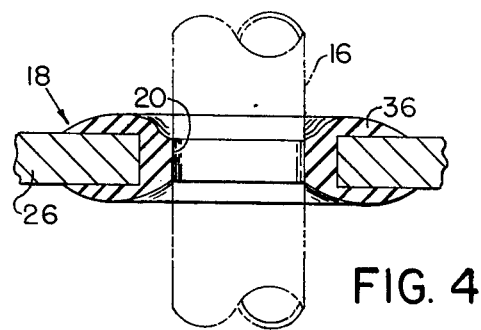
FIG. 4 is an enlarged fragmentary sectional view taken along the line 4—4 of FIG. 2.
Figure 5:
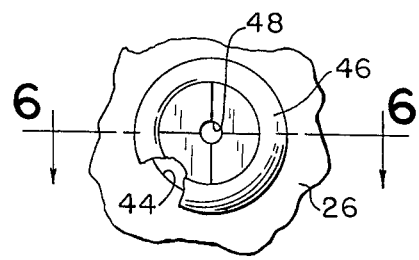
FIG. 5 is a somewhat enlarged fragmentary elevational view of a portion of the panel assembly shown in FIG. 2.

Referring now to FIG. 6 another embodiment of the invention is shown which comprises a panel assembly 18a and which includes a panel section 26a. The section 26a has a cylindrical aperture 20a through it. A flexible hose indicated at 16a includes two flexible hose sections 50 and 52 coupled in fluid communication with each other by a coupling member 54 which is fastened to the panel 26a and extends through the aperture 20a. The coupling member 54 projects from opposite sides of the panel 26a and has coupling nuts 56 and 58 at its opposite ends for releasably securing the hose sections 50 and 52 thereto. The panel assembly 18a may be positioned within a window opening and the hose sections 50 and 52 coupled to it, thereby avoiding the necessity of pulling the hoses through gasketed openings in the panel, as is generally required with the panel assembly 18 previously described.

I claim:

1. In combination with a mobile cleaning apparatus including a vehicle and a cleaning machine carried by the vehicle and having at least one flexible hose attached thereto, a panel assembly having at least one variable dimension for positioning in an opening defined by a window frame and a movable window supported by the frame, said panel assembly having an aperture therein receiving an associated portion of said hose therethrough, said aperture closely complementing said associated portion.

2. The combination as set forth in claim 1 wherein said panel assembly includes a plurality of panel sections and means supporting said sections for sliding movement relative to each other in the direction of extent of said variable dimension.

3. The combination as set forth in either claim 1 or claim 2 wherein said panel assembly has a hole therethrough substantially larger than said associated portion of said one hose and a flexible gasket mounted thereon within said hole and defining said aperture.

4. The combination as set forth in claim 3 wherein said gasket is in sealing engagement with said associated portion.

5. The combination as set forth in either claim 1 or claim 2 wherein said flexible hose includes two flexible hose sections coupled in fluid communication with each other by a coupling member and said coupling members is fastened to said panel assembly and extends through said aperture.

6. The combination as set forth in claim 5 wherein said coupling member projects from opposite sides of said panel assembly and includes coupling means at its opposite ends for releasably securing said hose sections to said coupling member.

7. A panel assembly for a mobile cleaning apparatus including a vehicle and a cleaning machine having at least one flexible hose attached thereto, said panel assembly comprising a plurality of panels, means for varying at least one dimension of said panel assembly, said panel assembly having an aperture therein for receiving an associated portion of said one hose therethrough said aperture closely complementing said associated portion.

8. A panel assembly for a mobile cleaning apparatus as set forth in claim 7 wherein said panel assembly has a hole therethrough substantially larger than said associated portion of said one hose and a flexible gasket mounted thereon within said hole and defining said aperture.

9. A panel assembly for a mobile cleaning apparatus as set forth in claim 7 wherein the flexible hose includes two flexible hose sections and said panel assembly includes a hose coupling member fastened thereto and extending through said aperture for coupling said hose sections in fluid communication.

10. A panel assembly for a mobile cleaning apparatus as set forth in claim 9 wherein said coupling member projects from opposite sides of said panel assembly and includes coupling means at its opposite ends for releasably securing said hose sections to said coupling member.

* * * * *